(12) United States Patent
Pedretti

(10) Patent No.: US 7,926,225 B2
(45) Date of Patent: Apr. 19, 2011

(54) NODE ELEMENT FOR PNEUMATIC COMPONENTS

(75) Inventor: Mauro Pedretti, Biasca (CH)

(73) Assignee: Prospective Concepts AG, Glattbrugg (CH)

( * ) Notice: Subject to any disclaimer, the term of this patent is extended or adjusted under 35 U.S.C. 154(b) by 1222 days.

(21) Appl. No.: 10/517,787

(22) PCT Filed: Mar. 31, 2003

(86) PCT No.: PCT/CH03/00207
§ 371 (c)(1),
(2), (4) Date: Jul. 25, 2005

(87) PCT Pub. No.: WO04/001162
PCT Pub. Date: Dec. 31, 2003

(65) Prior Publication Data
US 2006/0033335 A1   Feb. 16, 2006

(30) Foreign Application Priority Data

Jun. 19, 2002   (CH) .................................. 1042/02

(51) Int. Cl.
*E04B 1/34*  (2006.01)
(52) U.S. Cl. ........ 52/2.18; 52/653.2; 403/171; 403/176; 403/336; 403/337
(58) Field of Classification Search .............. 403/169, 403/171, 176, 262, 336, 337; 52/2.11, 2.13, 52/2.18, 81.3, 653.2, 655.1, 655.2; 285/125.1, 285/130.1, 133.6, 901, 412, 414; 14/27; 138/89.3, 123
See application file for complete search history.

(56) References Cited

U.S. PATENT DOCUMENTS

| | | | | |
|---|---|---|---|---|
| 1,302,293 A * | 4/1919 | Blazer | .......................... | 52/653.2 |
| 4,065,890 A * | 1/1978 | Fenner | .......................... | 403/173 |
| 4,271,654 A * | 6/1981 | Jungbluth | .................... | 52/655.1 |
| 5,341,567 A * | 8/1994 | Grenci et al. | ................. | 285/350 |
| 5,546,707 A * | 8/1996 | Caruso | .......................... | 52/2.13 |
| 6,012,742 A * | 1/2000 | Kocian et al. | ................. | 285/114 |
| 6,543,730 B2 * | 4/2003 | Pedretti | .......................... | 248/52 |

FOREIGN PATENT DOCUMENTS

| | | |
|---|---|---|
| EP | 1 210 489 | 6/2002 |
| FR | 2 341 017 | 9/1977 |
| WO | WO 01/20215 | 3/2001 |
| WO | WO 01/73245 | 10/2001 |

* cited by examiner

*Primary Examiner* — Michael P Ferguson
(74) *Attorney, Agent, or Firm* — Winstead PC

(57) ABSTRACT

Joint element for a pneumatic structural element (1) according to the prior art, comprising a sleeve (2), a compression member (3), two tension members (4) and two spherical caps (5). In each case one joint element is fitted for the spherical caps (5) such that an opening (10) accommodates the spherical cap (5). The joint elements serve for introducing tensile and compressive forces, in a manner free of bending moments, into the pneumatic structural element (1), the compressive forces being absorbed by the compression member (3) and the tensile forces being absorbed by the tension members (4). The joint element has holes (12) for fastening the compression member (3) with a screw (15), on the one hand, and holes (11) for accommodating the tension members (4), on the other hand. The symmetrical arrangement of the holes (11, 12) ensures that the vectors of bearing forces and of the tensile and compressive forces in the joint element added together give zero and, furthermore, the bending moments occur symmetrically in relation to the compression members (3). Configuring the joint element as a plate (9) ensures that torques are neither introduced from the outside nor diverted to the outside.

13 Claims, 4 Drawing Sheets

Fig. 1a (Prior Art)
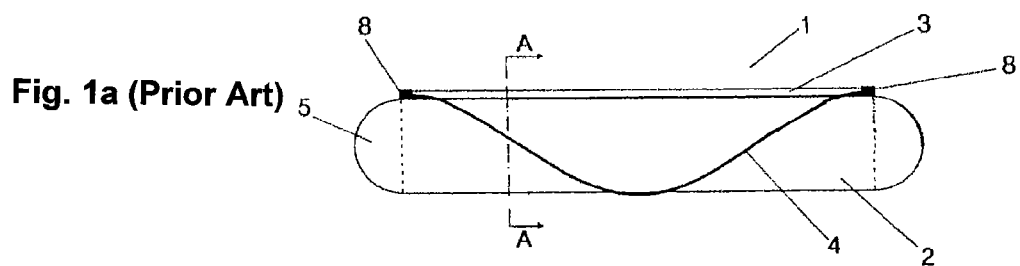
Fig. 1b (Prior Art)
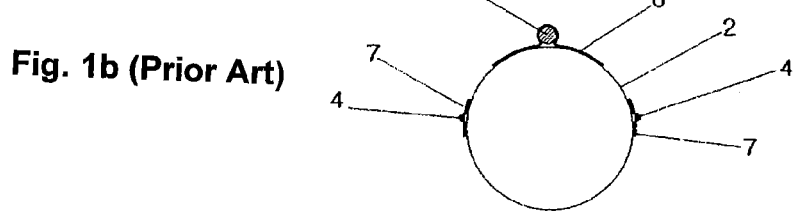
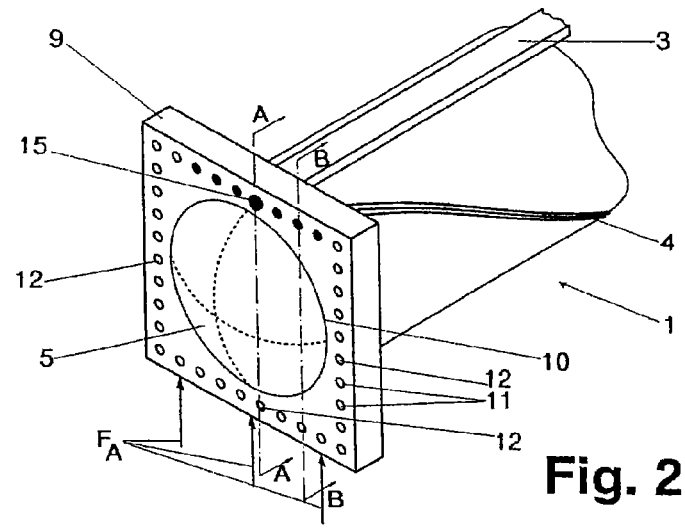
Fig. 2

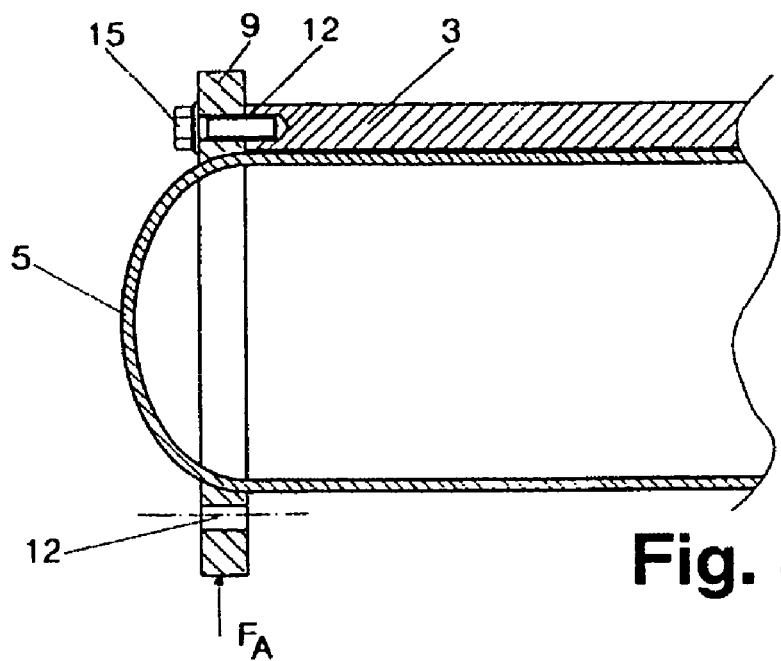
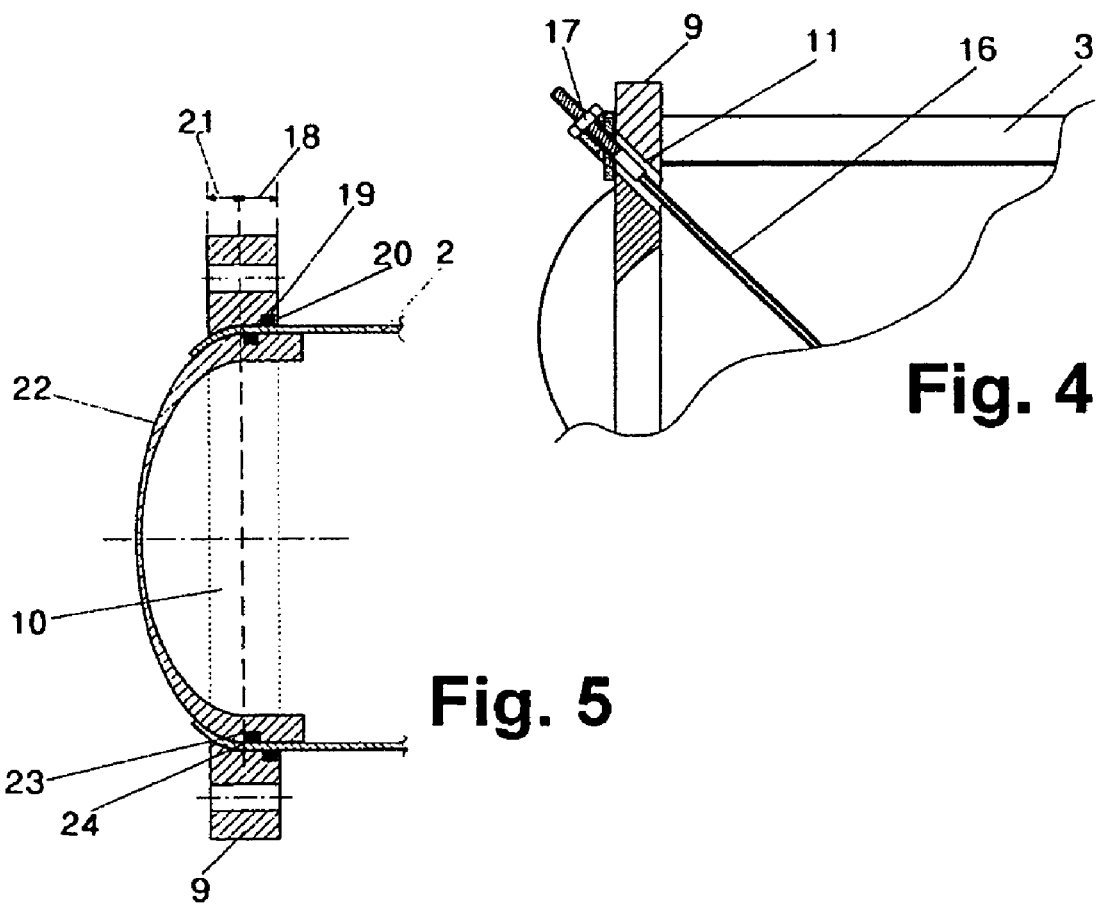

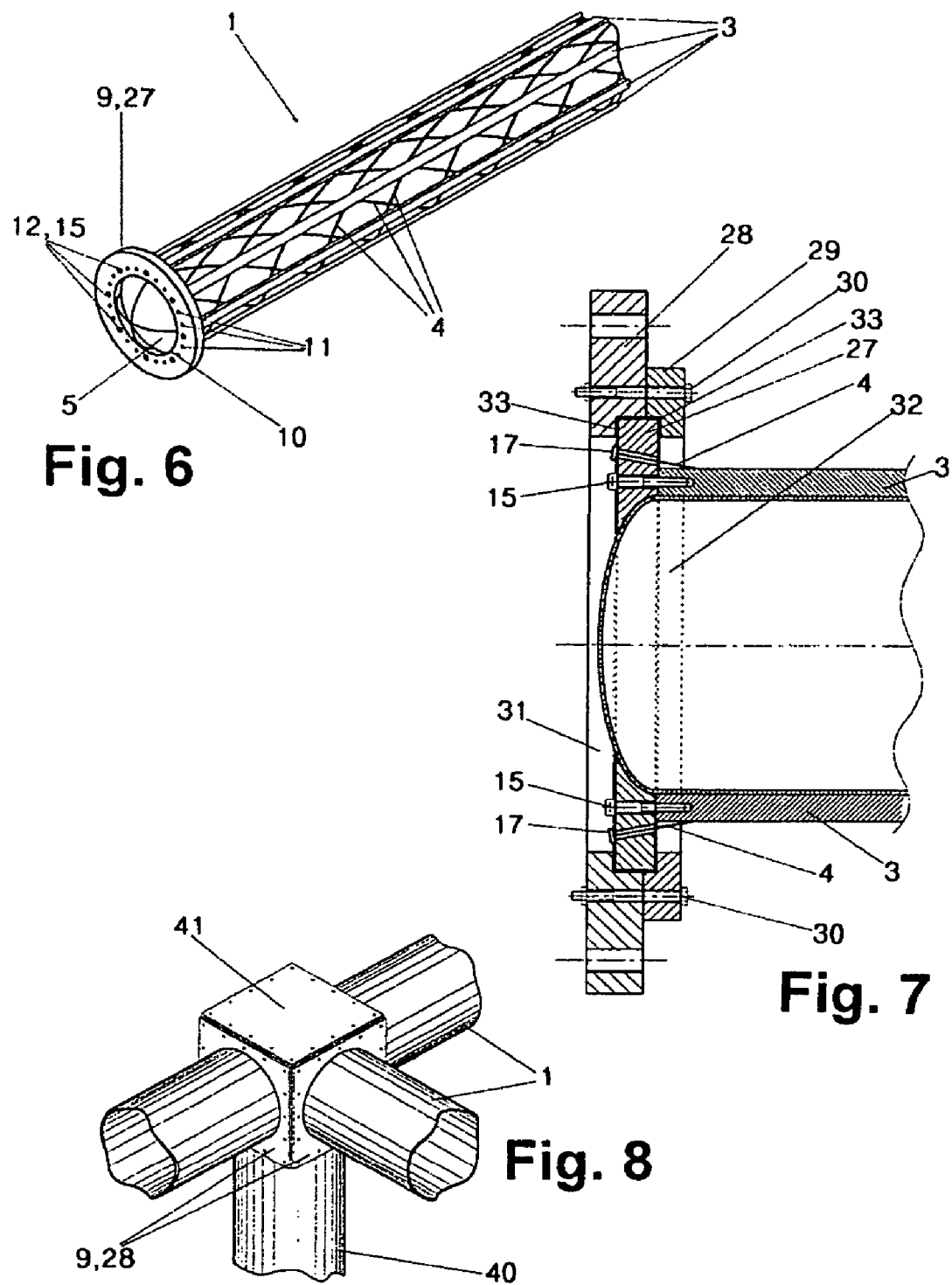

NODE ELEMENT FOR PNEUMATIC COMPONENTS

BACKGROUND OF THE INVENTION

1. Technical Field

The present invention relates to a joint element for pneumatic structural elements and associated connecting elements.

2. History of the Related Art

Joint elements for non-pneumatic structural elements are known per se, for example going by the name of MERO systems. The task of these joint elements is to introduce tensile and compressive forces, in a manner free of bending moments, into framework structures. A pneumatic structural element is known, for example, from European Patent Application 01 903 559.1 of the same inventor. The operation of connecting the structural element described in this document to a joint using known means, however, is not without problems since bending moments produced from the reaction to bearing pressure cannot be completely avoided without excessive outlay in respect of auxiliary structural means.

The object of the present invention is to provide a joint element which allows the tensile, compressive and bearing forces to be brought together without the occurrence of local bending moments and which, furthermore, also allows the bearing forces to be introduced into known and conventional structural elements.

BRIEF DESCRIPTION OF THE DRAWINGS

A more complete understanding of the device of the present invention may be obtained by reference to the following Detailed Description, when taken in conjunction with the accompanying Drawings, wherein:

FIG. 1a is a side elevational view of a prior art pneumatic structural element;

FIG. 1b is a front cross-sectional view of the prior art pneumatic structural element of FIG. 1a;

FIG. 2 is a perspective view of a first exemplary embodiment of a joint element;

FIG. 3 is a first longitudinal section view of the first exemplary embodiment of FIG. 2;

FIG. 4 is a second longitudinal section view of the first exemplary embodiment of FIG. 2;

FIG. 5 is a longitudinal section of a second exemplary embodiment;

FIG. 6 is a perspective view of a third exemplary embodiment;

FIG. 7 is a longitudinal section view of a fourth exemplary embodiment;

FIG. 8 is a perspective view of a first connecting element;

DETAILED DESCRIPTION OF ILLUSTRATIVE EMBODIMENTS OF THE INVENTION

Figure 9:
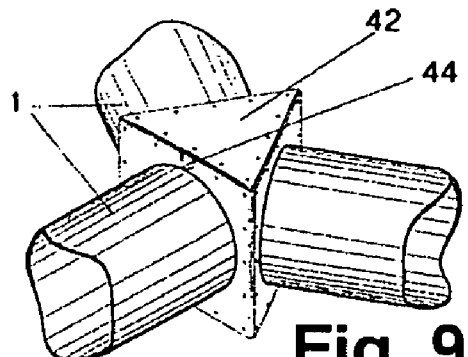
FIG. 9 is a perspective view of a second connecting element.

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

FIG. 1a is a schematic side view of a pneumatic structural element 1 according to the prior art. It comprises a sleeve 2, a compression member 3 and two tension members 4. The sleeve 2 is produced from a woven textile fabric which does not expand to a great extent and is either coated in a gas-tight manner or is provided internally with a flexible gas tube which is made of elastic polymer material and performs the sealing function. The compression member 3, as can be seen from FIG. 1b, has been pushed, for example, into a pocket 6, running along the sleeve 2 and fastened thereon by sewing and sealing, welding or adhesive bonding, and it extends over the entire, essentially cylindrical, length of the sleeve 2. At its ends, the compression member 3 is fixed to the ends of the two tension members 4, which are positioned in opposite helical directions around the sleeve 2 and abut tightly there. They may be drawn through lugs 7 fastened on the sleeve 2 in order for their position to be defined even when the sleeve 2 is slack. Joints 8 form the connecting locations of the compression member 3 and tension members 4.

At its ends, the sleeve 2 is closed by two spherical caps 5, for example made of the same material as the sleeve 2.

FIG. 2 is the perspective illustration of a first exemplary embodiment of the joint element according to the invention. The latter comprises a plate 9 with a large opening 10 for the spherical cap 5 of the pneumatic structural element 1. The plate 9 here is, for example, of square configuration and contains four lots of holes 11, 12. The four holes 12 are located in the center of a row of holes in each case. In the hole 12 of the top row of holes in FIG. 2, the compression member 3 is fastened, for example, with a screw 15, as can be seen from FIG. 3; FIG. 3 is the longitudinal section AA through the illustration of FIG. 2; FIG. 4 is the longitudinal section along section plane BB. The bores of the holes 11 run, for example, obliquely through the plate 9. In the exemplary embodiment according to FIG. 2, in each case three holes 11 to the left and right of the compression member 3 are occupied by in each case one cable 16. These in each case three cables 16 are guided parallel to one another and, together, form the tension member 4 described in relation to FIG. 1. The cables 16 are secured in the plate 9 by nuts 17, as is known from the technology of prestressing cables for reinforced-concrete structures. The holes 11, 12 which are occupied here are located on a straight line. Since the stressing of the cables 16 is equalized, the only bending moment is produced in the plate 9 itself; however, none is diverted to the pneumatic structural element.

In FIGS. 2 and 3, force arrows are designated $F_A$. These relate to the bearing forces. The vectors of the compressive forces, which are exerted by the compression member 3, of the tensile forces, which are produced by the cables 16, and of the bearing forces may be added together in the plate 9 to give zero, without bending moments being produced in the compression member 3. Possible materials for the plate 9 are, for example, aluminum, glass-fiber-reinforced plastics, carbon-fiber-reinforced plastics or multi-layered plywood.

FIG. 5 illustrates, as a second exemplary embodiment, a further configuration of the first exemplary embodiment. The plate 9, once again, has the large opening 10, albeit of particular design: in a first portion 18, the opening 10 is of a cylindrical configuration and contains a first O-ring groove 19 with a first O-ring 20. The latter provides sealing against the outside of the cylindrical part of the sleeve 2. The first cylindrical portion 19 is adjoined by a second portion 21, which essentially has the form of the spherical cap 5 located in the opening 10. Instead of the spherical cap 5, a cover 22 modeled, for example, on the spherical cap 5 is provided here. It is also possible—depending on expediency—for this cover to be formed in some other way; it is only its essentially conical or spherical profile within the second portion 21 which is essential to the invention.

Also within the cylindrical part of the first portion 18, the cover 22 is likewise cylindrical and, there, contains an O-ring groove 23 with a second O-ring 24, which provides sealing against the inside of the cylindrical part of the sleeve 2. The sleeve 2 is clamped in between the plate 9 and the cover 22, in the conical or spherical part 21 of the opening, by the cover 22, and the latter is forced against the plate 9 by the positive pressure prevailing in the sleeve 2. The sealing function is performed, as has been described, by the two O-rings 20, 24. The rest of the plate 9 may be configured in accordance with FIGS. 2, 3 and 4.

It is, of course, also possible for the cover 22, instead of being of spherical configuration, to have some other, for example planar, form, along with corresponding reinforcement of the wall.

A third exemplary embodiment of the joint element according to the invention is illustrated in FIG. 6. It is provided for a pneumatic structural element 1 with a plurality of—in this case eight—compression members 3 and, by way of example, two tension members 4 per compression member 3. The plate 9 here is designed as a round flange 27 with a large opening 10 for the spherical cap 5 of the pneumatic structural element 1. The flange 27 contains, in accordance with the number of compression members 3, holes 12 for the screws 15 for fastening the compression members 3. In accordance with the number of tension members 4 per compression member 3, the flange 27 contains holes 11 for fastening the tension members 4.

In the exemplary embodiment according to FIG. 6, the flange 27 does not contain any further holes. For fastening on further static structures and for the introduction of supporting forces, the flange 27, or a round plate 9 in general, can be clamped into a plate 28, as is illustrated in section in FIG. 7. The plate 28 here contains, for example, a circular opening 31 for accommodating the flange 27. A further, for example circular plate 29 contains an opening 32. Both plates 28, 29 are provided with a circular shoulder 33 which fits with the necessary amount of accuracy over the flange 27 and accommodates the latter. By means of screws 30, the two plates 28, 29 can be fastened in a force-fitting and form-fitting manner on one another. The external form of the plate 28 may be round, quadrilateral or polygonal, depending on the structural and design-related requirements. It may, furthermore, contain a multiplicity of holes 34 for fastening the pneumatic structural element 1 on further static structures and for introducing supporting and bearing forces.

Of course, it is also possible for the plate 9 according to FIGS. 2, 3, 4 and 5 to be of circular configuration and to be encased by means of the plates 28, 29 described in relation to FIG. 7.

The possible formations either of the plate 9 itself—as has already been illustrated in FIG. 2—or of the plate 28 according to FIG. 7 belong to the joint element according to the invention.

Quadrilateral, or if need be square, plates 9, 28 can be used for connecting elements according to FIGS. 8, 9, 10 and 11, as is shown hereinbelow. If one or, at most, four pneumatic structural elements 1 is or are to be positioned, for example, on a column 40, as is illustrated in FIG. 8, then use may be made, for example, of a cubic connecting element 41. The plates 9, 28 are screwed onto the suitably designed connecting element 41. The pneumatic structural elements are only illustrated schematically; this is not associated with any restriction in their design.

A variant of this is shown in FIG. 9. Here, use is made of a connecting element 42 of triangular cross section for connecting, at most, three pneumatic structural elements 1.

Figure 10:
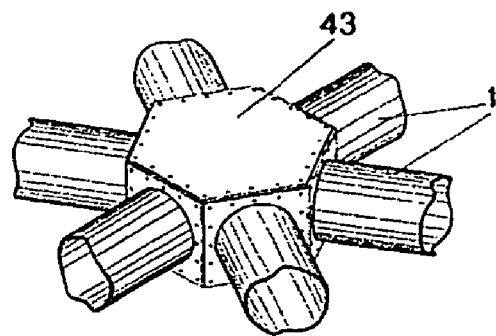
FIG. 10 is a perspective view of a third connecting element.

The exemplary embodiment of FIG. 10 is conceived for connecting, at most, six pneumatic structural elements 1. Accordingly, a connecting element 43 has a hexagonal horizontal projection with preferably square side surfaces. Designing the side surfaces as squares has the advantage that, if the pneumatic structural elements 1 are equipped with four, eight or twelve compression members 3, there is no need to ensure correct orientation. If, however, a certain orientation is to be maintained, then this can be made certain by the provision of a protuberance 44, as is illustrated in FIG. 9. To summarize the configuration of the connecting elements 41, 42 and 43, their horizontal projection may be defined as polygonal, the bottom and top surfaces of the connecting elements 41, 42 and 43 being of equal magnitude and the pneumatic structural elements 1 fastened thereon all being located in the same plane.

Figure 11:
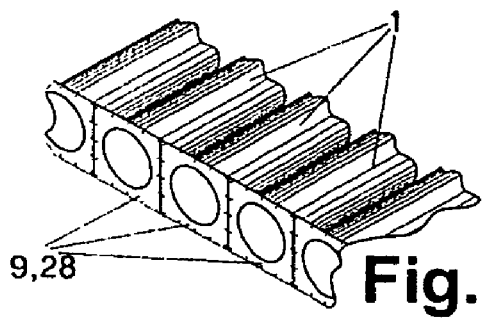
FIG. 11 is a perspective view of a fourth connecting element.

FIG. 11 shows a further exemplary embodiment of a planar arrangement of pneumatic structural elements 1. In this case, the, for example, square plates 9, 28 are screwed one beside the other to a carrying element (not illustrated). Such carrying elements, as structures which are known per se, do not form a constituent part of the invention. This arrangement can be used to produce, for example, a roof surface.

Figure 12:
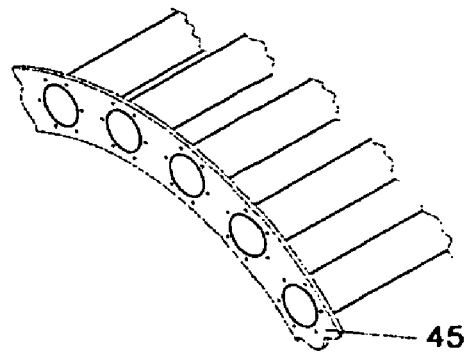
FIG. 12 is a perspective view of a fifth connecting element.
Figure 13:
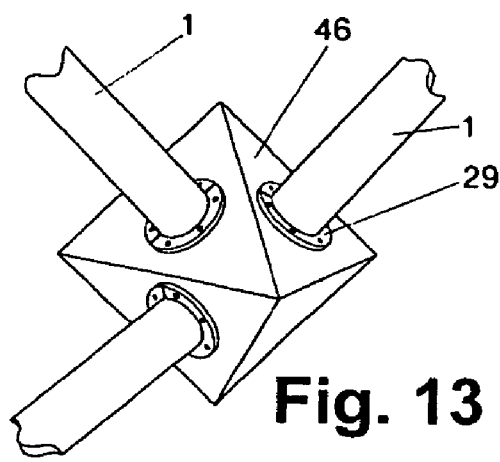
FIG. 13 is a perspective view of a sixth connecting element.
Figure 14:
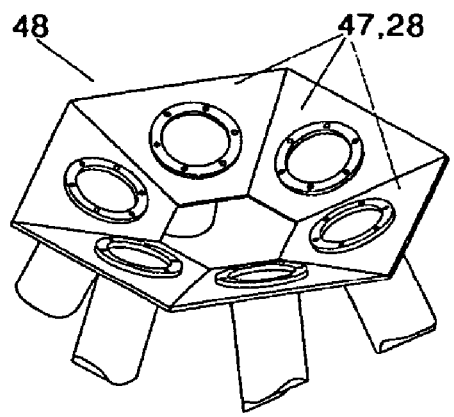
FIG. 14 is a perspective view of a seventh connecting element.

FIGS. 12, 13 and 14 are illustrations of non-planar arrangements. FIG. 12 shows a connecting element 45 which is, for example, of curved configuration. It is, furthermore, configured such that it can perform the function of the plate 28, that is to say the connecting element 45 here has five circular openings 31 and, for example, six holes for screws 30 per opening 31. By means of these screws, the further plate 29, which belongs to each pneumatic structural element 1, but is not illustrated in FIG. 12, is screwed to the connecting element 45.

In the exemplary embodiment according to FIG. 13, a plurality of pneumatic structural elements are connected to a connecting element 46 which is configured as a polyhedron—in this case an octahedron. The pneumatic structural elements are attached to the connecting element 46 in the same way as has been explained in relation to FIG. 12. As an alternative to this, it is also possible for each plate 9, 28 to be in the form of the corresponding side of the polyhedron, in which case the polyhedron is then configured essentially from bars which form its edges.

In FIG. 14, a plurality of, for example six, planar plates 47 are joined together by welding, or by screw connections (not illustrated), to form a pyramid-like connecting element 48 which is open at the top. Each plate 47 has, for example, the function of a plate 28 according to FIG. 7.

As a variant to this, it is likewise possible for the plates 9 according to FIG. 2 to be formed such that they correspond to the plates 47 according to FIG. 14. The connecting element 48 then comprises, for example, as has already been explained analogously in relation to FIG. 13, bars, which form the edges of the connecting element 48, to which the plates 47, for example, are screwed.

Although various embodiments of the device of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

The invention claimed is:

1. A pneumatic structural element comprising:
an elongated gas-tight inflatable hollow body having a longitudinal axis extending between opposing ends of the inflatable hollow body;
at least one compression member disposed on a longitudinal side of the inflatable hollow body and longitudinally extending the length of the hollow body substantially parallel to the longitudinal axis, the at least one compression member being subjected to axial compression responsive to an operational load applied to the pneumatic structural element;
at least two flexible tension members wound around the inflatable hollow body and longitudinally extending between the ends of the hollow body, the at least two flexible tension members being subjected to axial tension and equal stresses responsive to the operational load;
a rigid plate-shaped flange disposed at each end of the inflatable hollow body and connected to both the at least one compression member and the at least two flexible tension members, such that the at least one compression member is disposed between the at least two flexible tension members, the at least one compression member and the at least two flexible tension members being interoperably coupled to each other at the respective ends of the hollow body, each flange having an opening removably receiving a respective end of the hollow body and removably engaging a circumference of the hollow body, the flange operable to support a first compression force transmitted through and directed along a length of the compression member and a second tensile force transmitted through each of the at least two flexible tension members, the second tensile force being directed along a length of the at least two tension members;
wherein each at least one compression member is securely fastened within a respective first hole in each flange, and wherein the at least two flexible tension members are each securely fastened within a respective second hole in each flange; and
wherein the flange facilitates connection of the pneumatic structural element with a nodal connecting element for connecting the hollow body with other gas-tight inflatable hollow bodies.

2. The pneumatic structural element according to claim 1, wherein:
at least one end cap is received by and enclosed by the gas-tight inflatable hollow body;
the at least one end cap can be introduced flush into the gas-tight inflatable hollow body; and
the at least one end cap and the gas-tight inflatable hollow body are sealed in a gas-tight manner.

3. The pneumatic structural element according to claim 2, wherein:
the at least one end cap comprises a cylindrical part disposed at least in part within the gas-tight inflatable hollow body and a non-cylindrical part disposed at least in part exterior of the gas-tight inflatable hollow body; and
at least one first O-ring is disposed in a respective first O-ring groove disposed in the cylindrical part and a second O-ring is disposed in a second O-ring groove disposed in the opening of the rigid plate-shaped flange.

4. The pneumatic structural element of claim 1, comprising:
a nodal connecting element operable to facilitate attachment of the rigid plate-shaped flange thereto; and
wherein the nodal connecting element is arranged such that bearing forces can be introduced into the rigid plate-shaped flange.

5. The pneumatic structural element according to claim 4, wherein the nodal connecting element is a frame structure on which the rigid plate-shaped flange can be fastened.

6. The pneumatic structural element according to claim 5, wherein the nodal connecting element is polygonal in at least one projection, and at least one rigid plate-shaped flange can be fastened on at least one side wall of the nodal connecting element.

7. The pneumatic structural element according to claim 6, wherein a plurality of rigid-shaped flanges can be fastened on a plurality of sides of the nodal connecting element.

8. The pneumatic structural element according to claim 5, wherein the nodal connecting element comprises a tetrahedron shape and the rigid plate-shaped flange can be fastened to a side of the nodal connecting element.

9. The pneumatic structural element according to claim 5, wherein the nodal connecting element comprises a cube shaped external form and the rigid plate-shaped flange can be fastened to a side of the nodal connecting element.

10. The pneumatic structural element according to claim 5, wherein the nodal connecting element comprises a truncated pyramid external form and the rigid plate shaped flange can be fastened to a side of the nodal connecting element.

11. The pneumatic structural element according to claim 5, wherein the rigid plate-shaped flange is fastened to the nodal connecting element by way of at least one screw.

12. The pneumatic structural element according to claim 1, wherein the rigid plate-shaped flange comprises at least one second set of first and second holes operable to allow attachment of at least one additional pneumatic structural element.

13. The pneumatic structural element according to claim 1, wherein the at least one compression member is connected to the flange by way of a screw fastened to the at least one compression member and received through the first hole in the flange; and wherein the at least two flexible tension members are each received through a respective one of the second holes in the flange and each fastened thereto with a nut.

* * * * *

UNITED STATES PATENT AND TRADEMARK OFFICE
CERTIFICATE OF CORRECTION

| | | |
|---|---|---|
| PATENT NO. | : 7,926,225 B2 | Page 1 of 1 |
| APPLICATION NO. | : 10/517787 | |
| DATED | : April 19, 2011 | |
| INVENTOR(S) | : Mauro Pedretti | |

It is certified that error appears in the above-identified patent and that said Letters Patent is hereby corrected as shown below:

COLUMN 6, CLAIM 7

Replace "wherein a plurality or rigid-shaped flanges"
With --wherein a plurality of rigid plate-shaped flanges--

Signed and Sealed this
Tenth Day of January, 2012

David J. Kappos
*Director of the United States Patent and Trademark Office*